United States Patent [19]
Baughman et al.

[11] Patent Number: 5,856,710
[45] Date of Patent: Jan. 5, 1999

[54] INDUCTIVELY COUPLED ENERGY AND COMMUNICATION APPARATUS

[75] Inventors: James Stuart Baughman, Deford; Kevin C. Ross, Hemlock, both of Mich.

[73] Assignee: General Motors Corporation, Detroit, Mich.

[21] Appl. No.: 920,576

[22] Filed: Aug. 29, 1997

[51] Int. Cl.⁶ ................................................. B60R 21/32
[52] U.S. Cl. .................. 307/10.1; 307/9.1; 307/104; 307/17; 280/735; 439/15; 439/950; 336/DIG. 2
[58] Field of Search ..................... 307/9.1, 10.1, 307/10.6, 10.8, 104, 17; 340/425.5, 480, 481, 870.31, 870.32, 870.33, 310.07, 854.8; 280/727, 728.1, 728.2, 734, 735; 180/6.5, 271, 273, 274, 277, 279, 280; 439/1, 15, 164, 950; 336/65, 75, 123, 128, 129, DIG. 2; 701/1, 29, 36, 45, 49

[56] References Cited

U.S. PATENT DOCUMENTS

| | | | |
|---|---|---|---|
| 3,710,360 | 1/1973 | Flachsbarth | 340/174.1 H |
| 3,924,174 | 12/1975 | Fahrner | 323/53 |
| 4,157,854 | 6/1979 | Beauch | 339/3 S |
| 4,218,073 | 8/1980 | Cymbal | 280/731 |
| 4,223,911 | 9/1980 | Cymbal et al. | 280/731 |
| 4,321,572 | 3/1982 | Studer et al. | 336/83 |
| 4,598,325 | 7/1986 | Tarzaiski | 360/39 |
| 4,608,550 | 8/1986 | Umebayashi | 340/870.31 |
| 4,609,904 | 9/1986 | Paine | 307/10.1 |
| 4,616,224 | 10/1986 | Reighard | 307/10.1 |
| 4,628,310 | 12/1986 | Reighard et al. | 340/825.72 |
| 4,657,326 | 4/1987 | Zeller et al. | 339/3 S |
| 4,675,638 | 6/1987 | Szabo | 336/DIG. 2 |
| 4,766,326 | 8/1988 | Hayashi | 307/10.1 |
| 4,792,783 | 12/1988 | Burgess et al. | 340/22 |
| 4,886,460 | 12/1989 | Olgren | 439/15 |
| 5,272,350 | 12/1993 | Solari et al. | 250/551 |
| 5,347,256 | 9/1994 | Yumiki et al. | 336/84 C |
| 5,412,253 | 5/1995 | Hough | 307/17 |
| 5,422,519 | 6/1995 | Russell | 307/104 |
| 5,442,956 | 8/1995 | Persson | 73/118.1 |
| 5,498,911 | 3/1996 | Bossler et al. | 307/10.1 |
| 5,515,399 | 5/1996 | Swart | 333/177 |
| 5,636,863 | 6/1997 | Reid et al. | 281/735 |
| 5,692,915 | 12/1997 | Ishikawa et al. | 439/15 |
| 5,696,409 | 12/1997 | Handman et al. | 307/10.1 |

FOREIGN PATENT DOCUMENTS

| | | |
|---|---|---|
| 53-20240 | 2/1978 | Japan . |
| 58-115945 | 7/1983 | Japan . |
| 1-154616 | 10/1990 | Japan . |

OTHER PUBLICATIONS

"Rotary Transformer Power and Data Transfer", Research Disclosure, #33505, Mar. 1992 p. 165.

*Primary Examiner*—Richard T. Elms
*Assistant Examiner*—Peter Ganjian
*Attorney, Agent, or Firm*—Vincent A. Cichosz

[57] ABSTRACT

An apparatus for transferring power and communication data across an annular gap comprises an inductively-coupled primary coil winding and secondary coil winding rotatable therein. Two signal oscillators are electrically coupled to a transistor for controlling current flow through the primary coil winding, thereby inducing a signal with a respective frequency in the secondary coil winding. An electronic switch operates so as to apply one of the two signals to the transistor for charging a capacitor coupled to the secondary coil winding, and operates so as to apply the other of the two signals to the transistor for discharging the capacitor. Actuation of control devices operate so as to modulate the impedance of the secondary coil winding. The inductive coupling of the two coil windings results in this modulation being mirrored by a modulation of the voltage developed across the primary coil winding. The primary coil winding voltage is compared to a threshold voltage for decoding the modulated voltage and determining actuation of the control devices.

12 Claims, 4 Drawing Sheets

INDUCTIVELY COUPLED ENERGY AND COMMUNICATION APPARATUS

TECHNICAL FIELD

This invention relates to an apparatus for inductively transferring energy and communication data. In particular, the invention is concerned with such transfer from a vehicle side wiring harness to a ratable steering wheel.

BACKGROUND OF THE INVENTION

Vehicles equipped with inflatable restraints ("airbags") located in the bowl of a steering wheel utilize an electrically-actuated inflation device ("inflator") for deployment of the airbag in the event of a severe crash. Detection of a deployment crash conditions may be accomplished by a variety of means including conventional ball and tube inertial sensors, piezoelectric accelerometers or other varieties of known accelerometers. If a crash is determined by the controller to meet predetermined deployment conditions, an appropriate firing signal is output to the inflator which initiates deployment by sending current through a squib which in turn ignites a solid propellant.

Transfer of the deployment current to the inflator requires a means of electrical connection from a vehicle side wiring harness up the steering column an to the inflator. Typically, this electrical connection has been accomplished by means of a clockspring-type conductor allowing for full stop-to-stop steering wheel rotation while maintaining continuous electrical connectivity with the inflator.

A typical prior art clockspring-type conductor comprises a stationary outer housing coupled to the steering column, an inner housing rotatably supported by the outer housing and drivingly coupled to the steering shaft, and an electrical conductor supported by the stationary housing and loosely wound a plurality of turns around the inner housing. The conductor has one end connected via an electrical connector with the airbag controller via the vehicle side wiring harness, and its other end connected via an electrical connector with the inflator at the steering wheel. When the steering wheel is rotated in one direction, the conductor is wound tighter toward the inner housing and when rotated in the other direction, the conductor is loosened and unwound away from the inner housing.

To facilitate the addition of steering pad controls for controlling such vehicle systems as the radio, horn, windshield wipers, lights, heater and air conditioner, the device can incorporate multiple conductors. Alternative data communication interfaces of steering wheel controls includes optical couplers and slip ring configurations.

Although clockspring-type devices are satisfactory in electrical operation, they have certain mechanical shortcomings, for example: (i) incorrect installation during assembly or service of a steering system can result in the conductor cable being wound too tight, not allowing enough slack for full rotation of the steering wheel and causing damage to the connector if full rotation occurs, and (ii) clearances between the inner and outer housings necessary to permit rotation of the housings with respect to one another can result in a rattling or squeaking noise over bumpy roads or during rotation of the steering wheel.

Attempts to lock the inner and outer housings in position to prevent over-tightening of the connector cable during assembly or service of the steering system have included the use of an anti-rotation pin which is removed upon completion of the assembly. This, however, adds to the overall cost of the system, and complexity of its installation.

There is a desire to provide an apparatus for transferring power and communication data across the annular gap defined by a steering column and steering shaft without the need for any direct electrical connection, thereby overcoming the shortcomings of the prior art clockspring-type devices.

It has been proposed to couple a firing pulse current to an airbag inflator by rotary transformer action. However, the energy requirements of an inflator may preclude practical application of this concept due to size, mass and packaging concerns associated with a suitable transformer capable of developing the required energy with appropriate expediency.

SUMMARY OF THE INVENTION

The present invention is directed to an apparatus for inductively transferring energy and communication data between a vehicle side harness and a stewing wheel assembly. The energy is stored to actuate an inflator located in the bowl of the steering wheel for deployment of the inflatable restraint. The communication data is utilized for diagnostic monitoring of the inflator and for enabling actuation of vehicle systems by steering pad controls.

According to the present invention, a primary coil winding is fixably coupled to the steering column. A secondary coil winding is coupled to rotate in unison with the steering wheel. Preferably, the two windings are coaxially arranged within the steering column jacket, the secondary being the inner coil fixed to the rotatable steering shaft and the primary being the outer coil fixed to the jacket. The primary and secondary remain continuously inductively coupled regardless of rotation angle steering shaft and steering wheel.

An electrical load is rotatably secured to the steering column and includes an energy storage capacitor charged by energy inductively coupled from the primary winding to the secondary winding when the primary winding is oscillated at a first frequency and discharged through the air bag inflator when the primary winding is oscillated at the second frequency. The energy storage capacitor thereby allows for substantial reduction in the size and mass of the transformer windings since the energy necessary for deployment of the airbag can be accumulated for immediate delivery when required. An oscillator circuit on the vehicle side and coupled to the primary oscillates the primary at the first frequency during predetermined nondeployment conditions and at a second frequency during predetermined deployment conditions. Therefore, first oscillatory frequency charges the energy storage capacitor and the second oscillatory frequency communicates a firing signal for deployment of the airbag.

In accordance with additional communication aspects of the present invention, modulation circuitry is provided on the secondary side of the transformer for binary modulation of primary winding voltage amplitude in accordance with predetermined binary data. The modulation circuitry switches the secondary electrical load between first and second impedance values which correspond to the predetermined binary data. Demodulation circuit for demodulating primary winding voltage amplitude is provided on the primary side of the transformer for decoding the modulated primary voltage back into the binary data.

In a preferred form of the present invention, two oscillators generate electrical signals at respective predetermined frequencies. One oscillator generates a signal having a frequency of 96 KHz, while the other generates a signal having a frequency of 32.7 KHz. An controlled electronic switching apparatus applies one of the two signals to a low side driver (transistor) for controlling the energization frequency of the primary coil winding, thereby inducing a signal in the secondary coil winding with a corresponding frequency. The electronic switch operates to apply the 32.7 KHz in response to a deployment crash event; otherwise, the 96 KHz signal is applied.

Additional communication data transfer is accomplished by means of inductive impedance switching resulting in an amplitude modulation of the primary voltage. Steering pad control buttons are connected to a multiplexer which generates a serial output comprising a stream of serial binary data of a predetermined number of bits. Each control button has a unique serial set of binary data assigned to each of its actuation. A multiplexer transfers the serial data to a modulator which varies the impedance (load) of the secondary coil winding between one of two impedance values. Being that the two windings are inductively coupled, this impedance in the secondary coil winding is reflected back to the primary coil winding, varying the amplitude of the voltage developed across the primary coil winding. A demodulator coupled to the primary coil winding converts the varying amplitudes back into the serial data. Thereafter, the serial codes are demultiplexed to generate binary outputs corresponding to the current state of each control button.

BRIEF DESCRIPTION OF THE DRAWINGS

The present invention will now be described, by way of example, with reference to the accompanying drawings, in which.

DESCRIPTION OF THE PREFERRED EMBODIMENT

In the description that follows, similar parts or structures used in the figures will be designated with like numerals, and where such parts and structures have been previously discussed with respect to an earlier figure, the description will not be repeated.

Figure 1:
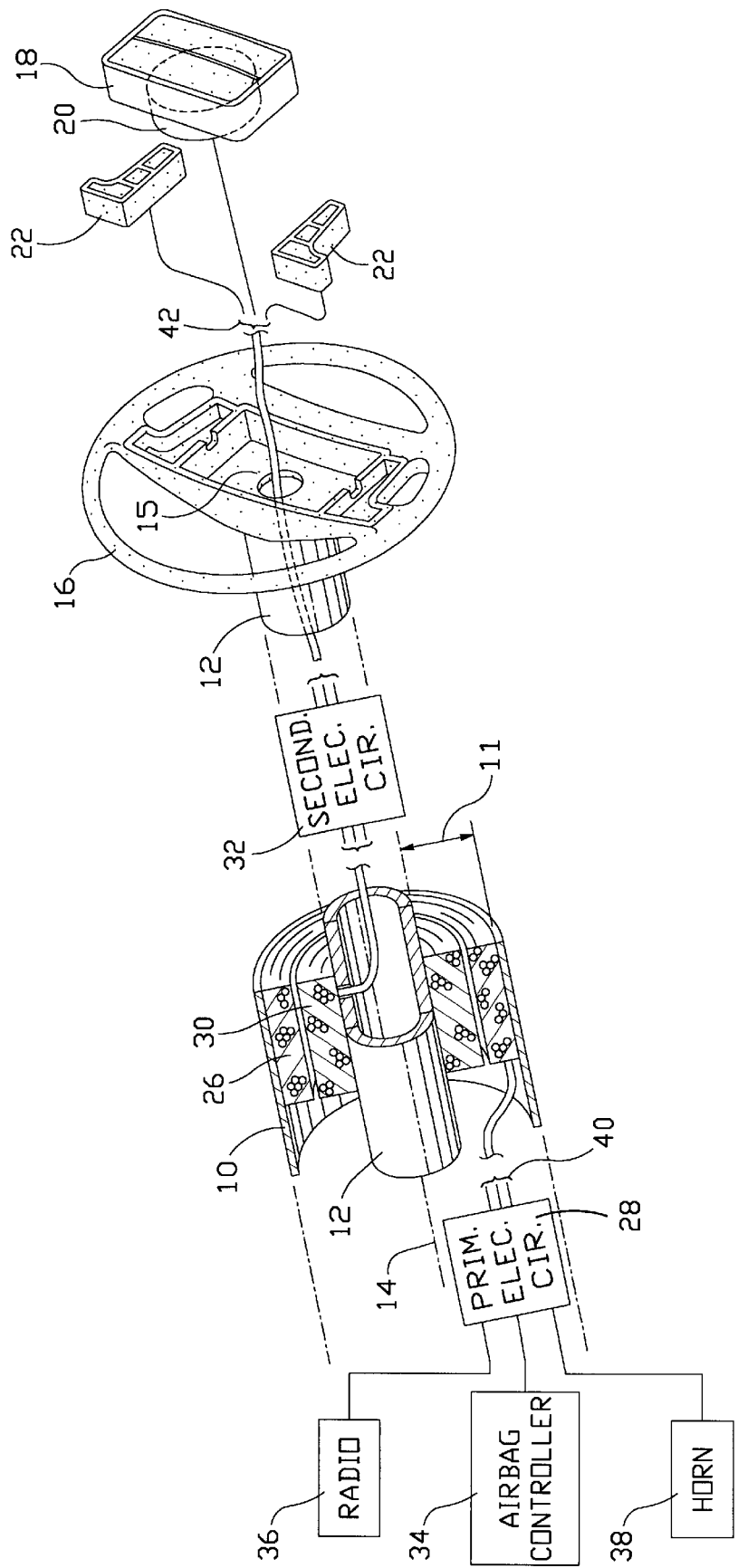
FIG. 1 illustrates an exploded perspective of a steering system incorporating the apparatus of the present invention.

Referring to the drawings, and more particularly to FIG. 1, a basic vehicle steering system comprises (i) a steering column 10 mounted to the vehicle chassis, (ii) a steering shaft 12 rotatably supported within the steering column 10 along a central axis 14, the steering column 10 and steering shaft 12, and (iii) a steering wheel 16 coupled to the steering shaft 12 for rotation therewith.

The steering wheel 16 comprises (i) an inflatable restraint module 18 located within the bowl 15 of the steering wheel 16, (ii) an electrically-actuated deployment device ("inflator") 20, and (iii) multiple control devices 22 such as pushbuttons and switches 22 for controlling such vehicle systems as the radio, horn, windshield wipers, lights, heater and air conditioner.

The apparatus according to the present invention comprises (i) a primary coil winding 26 mechanically coupled to the steering column 10 and electrically coupled to various vehicle systems 34, 36 and 38 via a primary-side electronic circuit 28, and (ii) a secondary coil winding 30 mechanically coupled to the steering shaft 12 and electrically coupled to the inflator 20 and steering pad controls 22 via a secondary-side electronic circuit 32. The primary and secondary coil windings 26 and 30 are preferably coaxial and positioned within annular gap 11 relative to one another such that they are inductively coupled, and remain as such despite rotation of the secondary coil winding 30 by the steering shaft 12. Axial adjacency of the primary and secondary provides an alternate arrangement.

By means of the apparatus of the present invention, energy and communication data is inductively transferred across the annular gap 11 between the steering column 10 and steering shaft 12 by means of the primary and secondary coil windings 26 and 30. Energy is transferred to enable deployment of the inflator 20 and for operation of the steering pad controls 22. Communication data is transferred to enable deployment of the air bag and additionally for diagnostic monitoring of the inflator 20 and monitoring actuation of the steering pad controls 22.

Figure 2A:
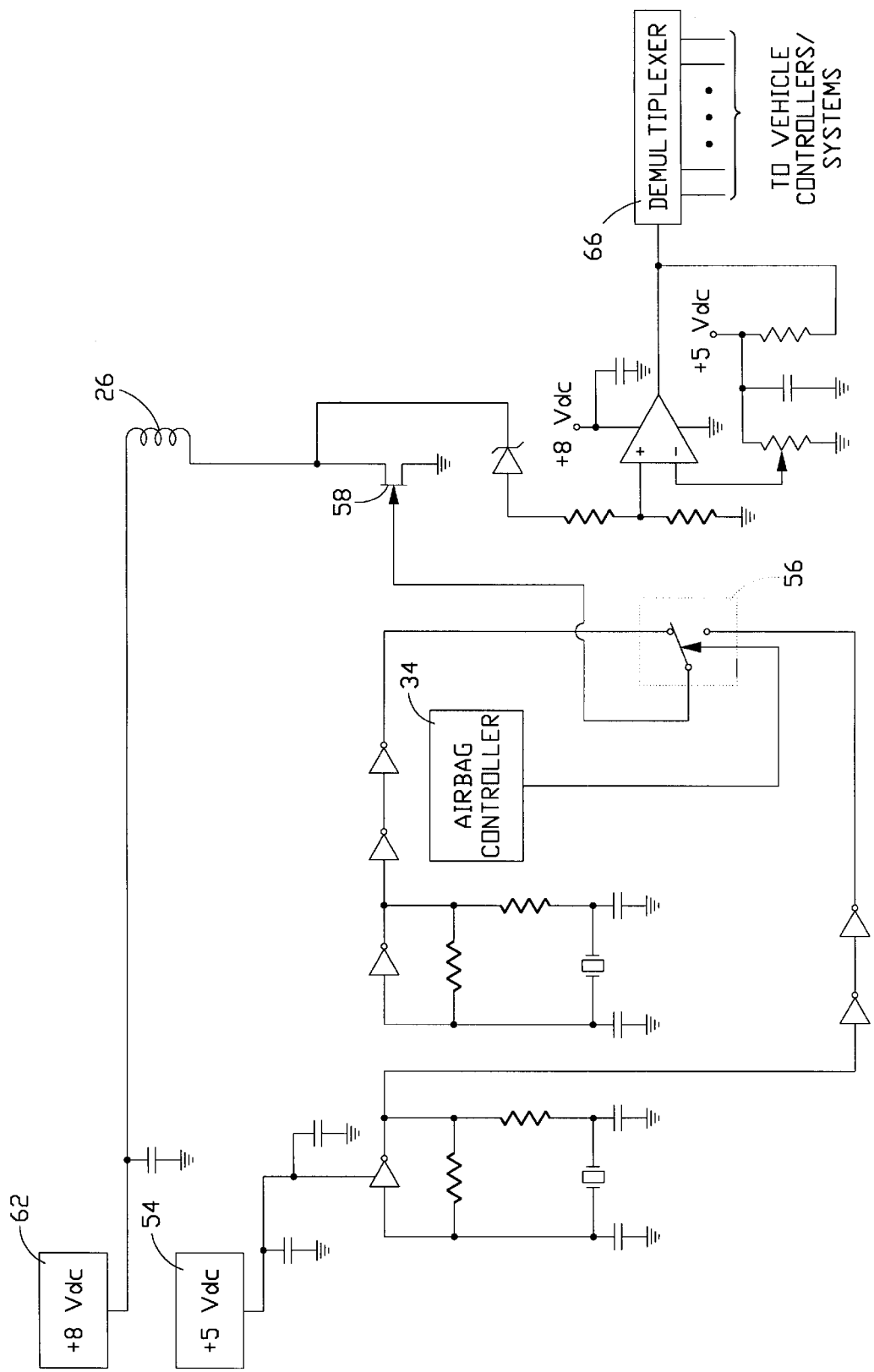
FIGS. 2A–B illustrate detailed electronic circuit diagrams of the preferred embodiment of the present invention.
Figure 2B:
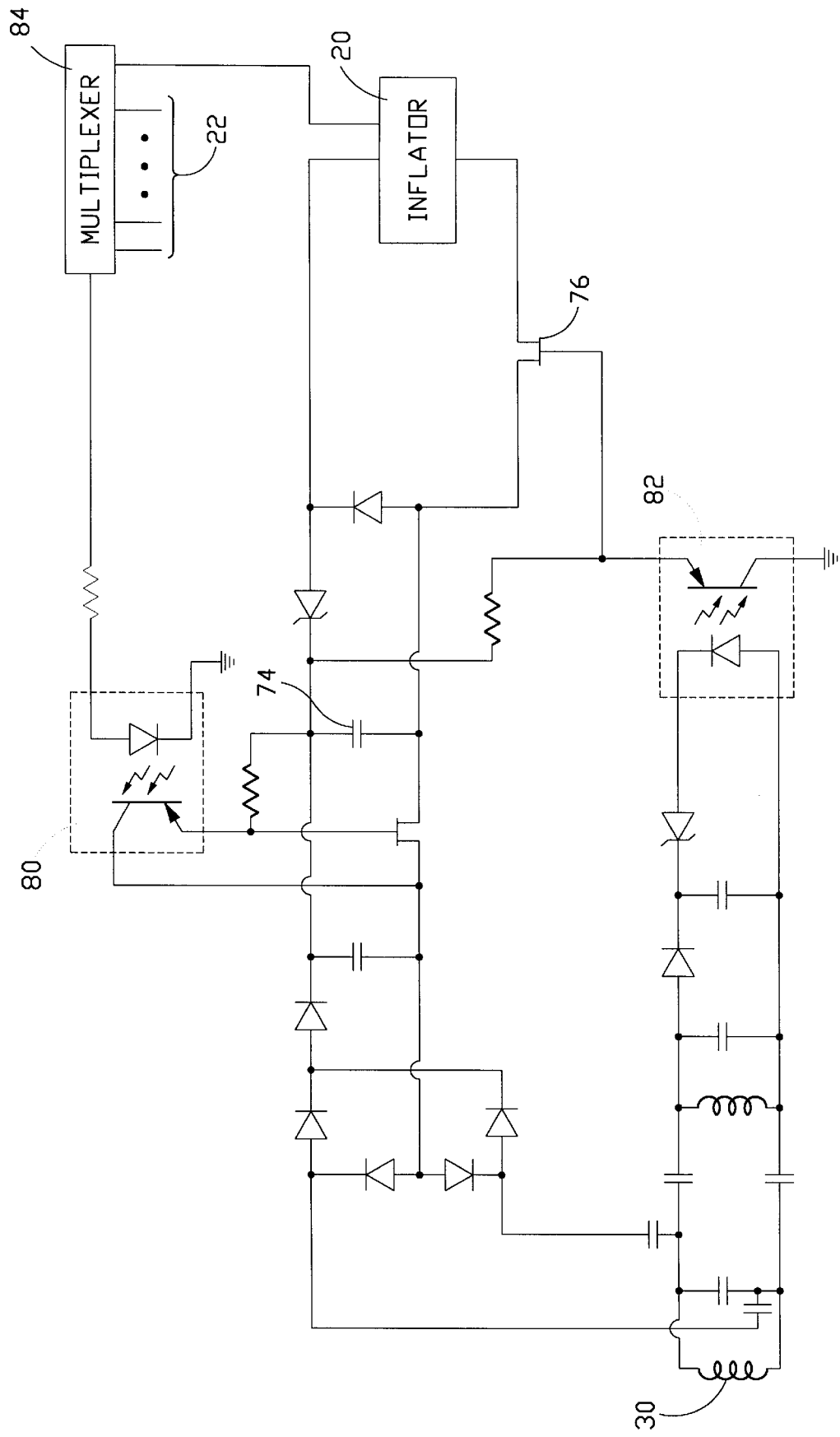

FIGS. 2A–B illustrate detailed circuit diagrams of the preferred embodiment of the primary- and secondary-side electronics, 28 and 32, respectively, according to the present invention. In order to facilitate an easier understanding of its operation, block diagrams of the general circuit arrangement are illustrated in FIGS. 3A–B.

Figure 3A:
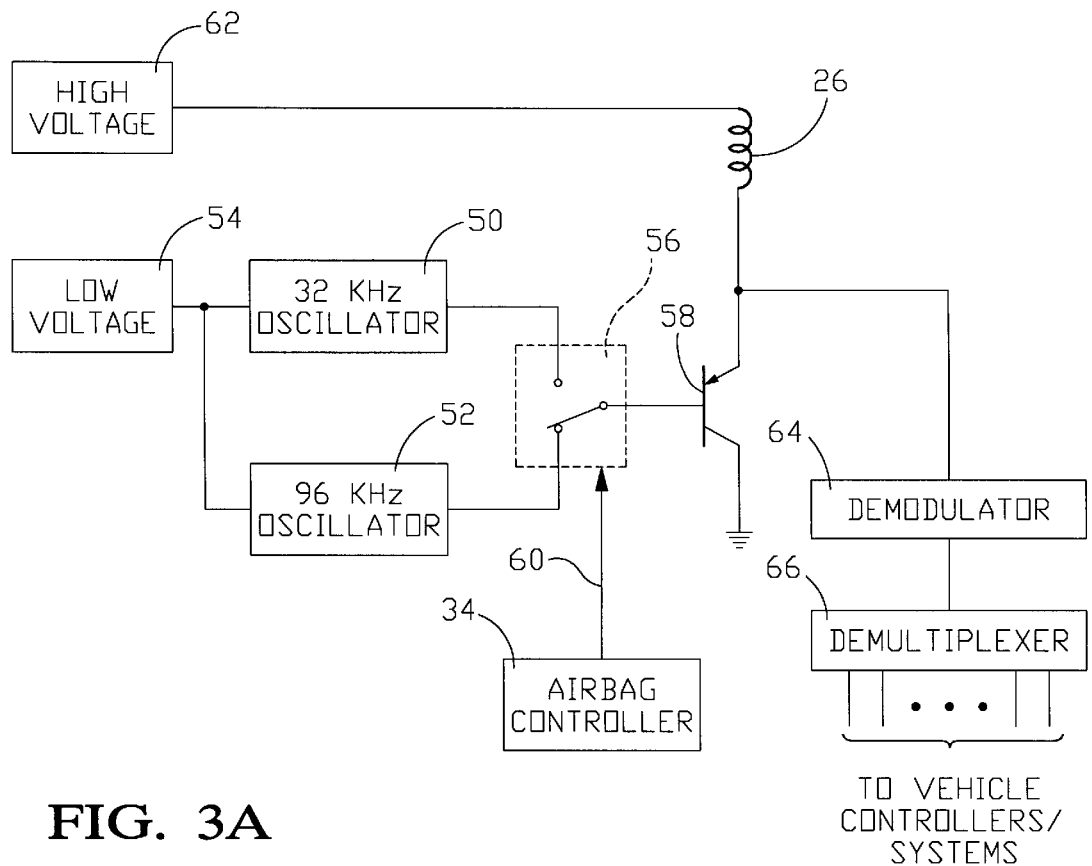
FIGS. 3A–B illustrate block diagrams of a general arrangement of the electronic circuitry detailed in FIGS. 2A–B.
Figure 3B:
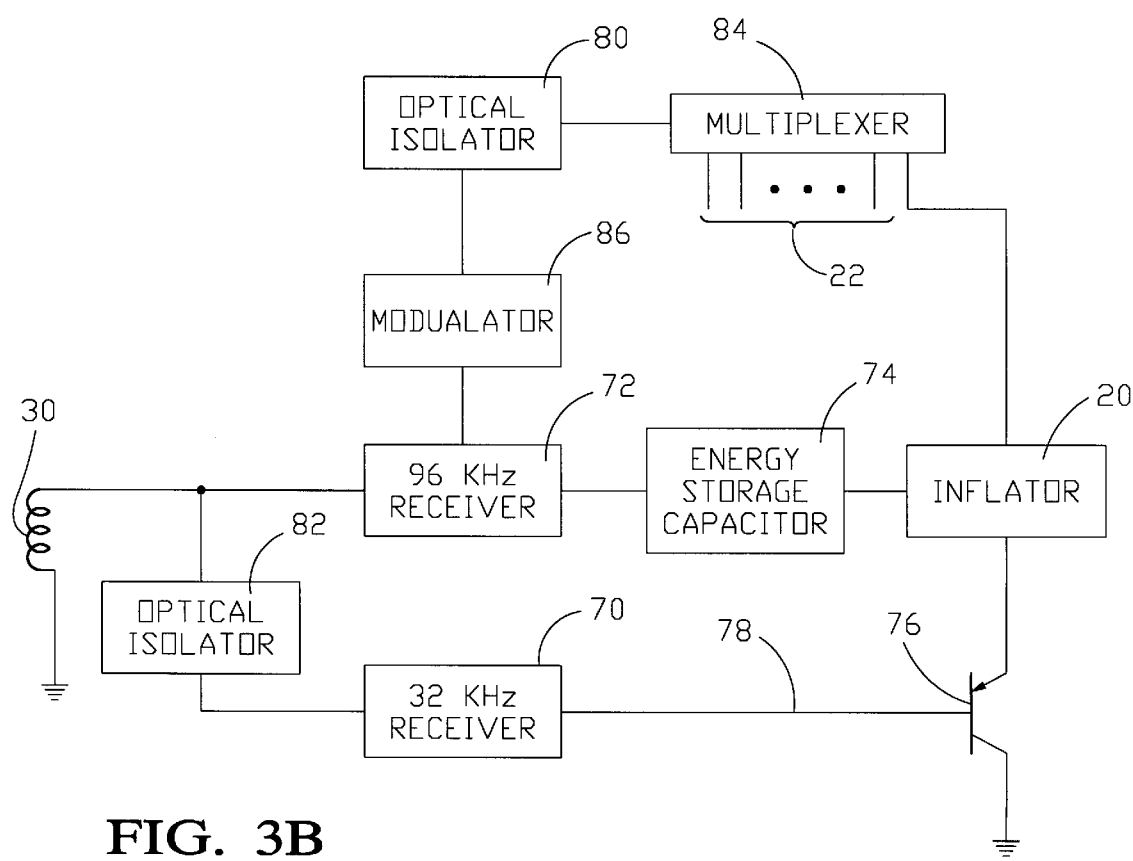

A block diagram of the general circuit arrangement of the primary-side electronic circuitry 28 is illustrated in FIG. 3A. Referring to FIG. 3A, two oscillator circuits 50 and 52 are provided for generating a 32.7 KHz and 96 KHz AC signal, respectively. The 96 KHz signal is utilized for energy transfer to the secondary side electronics including the charge storage capacitor and communication data transfer from the steering wheel side electronics to the primary side electronics, while the 32.7 KHz signal is utilized for initializing deployment of the airbag by communicating a deployment signal to the secondary side electronics. The oscillators 50 and 52 are powered by a low voltage source 54, typically +5 Vdc. The two signals are coupled to a conventional controlled electronic gating apparatus (switch) 56 illustrated schematically as a single pole-double throw switch, the output of which is connected to the gate of a low side driver (transistor) 58. The state of the switch 56 controls which of the two signals operates the transistor 58. If the 32.7 KHz signal is coupled to the gate, the transistor 58 will turn "on" (conduct current) and "off" with a frequency of 32.7 KHz. Similarly, if the 96 KHz signal is coupled to the gate, the transistor 58 will turn "on" and "off" with a frequency of 96 KHz, permitting a current to flow through the primary coil winding 26 with a corresponding frequency.

Generally, the normal non-deployment state of switch 56 is such that the 96 KHz signal is coupled to the gate of the transistor 58. However, deployment operation of the switch 56 couples the 32.7 KHz signal to the gate of the transistor 58. Operation of the switch 56 is controlled by an airbag deployment signal received from an airbag controller 34 via signal line 60.

Operation of the transistor 58 controls the current flow through the primary coil winding 26. When the transistor 58 is "on", the low voltage side of the primary coil winding 26 is grounded, permitting current to flow through the primary coil winding 26 from a high voltage source 62 (e.g., +8 Vdc) to ground, generating a magnetic field inductively coupling the primary and secondary coil windings 26 and 30. When the transistor 58 is turned "off", the low voltage side of the primary coil winding 26 is "open-circuited", interrupting the current and collapsing the magnetic field. Which of the two signals is coupled to the gate will determine the frequency of operation of the transistor 58 and thereby, the current flow through the primary coil winding 26, and ultimately the rise and collapse of an inductively coupling magnetic field.

A demodulator 64 and demultiplexer 66 are coupled to the low voltage side of the primary coil winding 26. They operate to decode communication data transferred from the secondary coil winding 30 to the primary coil winding 26. A more detailed description of their operation will be taken up below.

A block diagram of the general circuit arrangement of the secondary-side electronic circuitry 32 is illustrated in FIG. 3B. Referring to FIG. 3B, two receiver circuits 70 and 72 are coupled to a secondary coil winding 30. Each circuit 70 and 72 is "tuned" to a specific frequency for receiving either the 32.7 KHz or 96 KHz signals inductively transferred across the annular gap 11. Optical isolators 80 and 82 are provided for isolating the 32.7 and 96 KHz receiver circuits 70 and 72 from one another and from the rest of the secondary-side electronics 32.

An induced 96 KHz signal in the secondary coil winding 30 is received by the 96 KHz receiver circuit 72 and utilized to continuously charge an energy storage capacitor 74. The capacitor charge is maintained by the 96 KHz signal at a level necessary to actuate the inflator 20 for deployment of the airbag 18.

The capacitor 74 is coupled to the inflator 20 via a transistor 76, the gate of which is coupled to the 32.7 KHz receiver circuit 70. A 32.7 KHz signal induced in the secondary coil winding 30 will cause the 32.7 KHz receiver circuit 70 to activate, turning "on" the transistor 76 via signal line 78. This will, in turn, provide a discharge path for the capacitor 74 through the inflator 20, deploying the airbag 18. An alternative to tuned circuits for discrimination of the 96 KHz and 32.7 KHz secondary side signals is phase locked loop circuitry. Though not separately illustrated, substitution of phase locked loop detection circuitry may be substituted in place of the illustrated tuned receivers 70 and 72.

Generally, a 96 KHz signal is induced in the secondary coil winding 30. However, upon receipt of an airbag deployment signal via signal line 60, the primary side electronics 28 will interrupt the 96 KHz signal and induce a 32.7 KHz signal in the secondary coil winding 30 for initiating discharge of the capacitor 74 for deployment of the airbag 18.

The portion of the secondary-side circuit 32 described thus far is primarily concerned with the transfer of power across an annular gap 11 to power (charge) a capacitor 74 for storage of energy to deploy an airbag 18, and control of that deployment.

Secondary-side electronics 32 utilized for transfer of communication data across the annular gap comprise a multiplexer 84 and modulator 86. The multiplexer 84 receives binary inputs (having a "1" or "0" state value) from steering pad controls 22 and the airbag inflator 20. It converts these multiple binary inputs into a serial output comprising a stream of binary words (i.e., predetermined number of binary valves sequentially generated). There is a unique binary word assigned for each state of each binary input of the multiplexer 84.

The serial output is received by the modulator 86, which modulates an impedance of the secondary coil winding 30 accordingly. For example, if a binary "1" is received, the modulator 86 loads the secondary coil winding 30 with an added impedance. Upon receipt of a binary "0", the added impedance is removed.

The impedance of the secondary coil winding 30 affects the inductive coupling between the primary and secondary coil windings 26 and 30, and in particular, affects the amplitude of the voltage developed across the primary coil winding 26. For example, a greater impedance in the secondary coil winding 30 reduces the amplitude of the voltage developed across the primary coil winding 26, and vice versa. By modulating the impedance of the secondary coil winding 30 between two impedance levels, the voltage developed across the primary coil winding 26 will correspondingly modulate between two amplitude levels.

Referring back to FIG. 3A, the demodulator 64 compares the voltage in the low voltage side of the primary coil winding 26 with a predetermined threshold voltage each "off" cycle of the transistor 58. (Note that during each "on" cycle of the transistor 58, the secondary side of the primary coil winding 26 is at ground (0 Vdc) potential.) If the primary coil winding voltage is less than the threshold voltage, a binary "1" is generated by the demodulator 64. Otherwise, a binary "0" is generated.

The output of the demodulator 64 is therefore a serial output, comprising a stream of binary numbers having values of "1" or "0" identical to those output by the multiplexer 84 of the secondary-side circuitry of FIG. 3B. The demultiplexer 66 decodes the serial output to arrive at the binary status of each of the steering pad controls and the airbag inflator 20 at a data transfer rate of 96 KHz. This information can then be utilized by appropriate controllers for controlling the corresponding vehicle systems.

While the present invention has been described in reference to the illustrated embodiments, it will be recognized that various modifications will occur to those skilled in the art. In this regard, it will be understood that the apparatuses incorporating such modifications may fall within the scope of this invention, which is defined by the appended claims.

We claim:

1. An inductively coupled energy and data communication apparatus for a steering column assembly supporting a steering wheel assembly including an electrically actuated air bag inflator, the apparatus comprising:

a primary winding non-rotatably secured to the steering column and selectively oscillated at one of first and second frequencies;

a load rotatably secured to the steering column, said load including a secondary winding inductively coupled to the primary winding and an energy storage capacitor charged by energy inductively coupled from the primary winding to the secondary winding when the primary winding is oscillated at the first frequency and discharged through the air bag inflator when the primary winding is oscillated at the second frequency; and, an oscillator circuit for oscillating the primary winding at the first frequency during predetermined non-deployment conditions and for oscillating the primary winding at the second frequency during predetermined deployment conditions.

2. An inductively coupled energy and data communication apparatus as claimed in claim 1 further comprising:

modulation circuitry for binary modulation of primary winding voltage amplitude in accord with predetermined binary data, said modulation circuitry including circuitry for switching the load between first and second impedances corresponding to the predetermined binary data; and, demodulation circuit for demodulating primary winding voltage amplitude.

3. An inductively coupled energy and data communication apparatus as claimed in claim 1 wherein said oscillator circuit comprises first and second oscillators selectively coupled to the primary winding in accordance with a predetermined air bag deployment signal.

4. An inductively coupled energy and data communication apparatus as claimed in claim 1 wherein said primary and secondary windings are coaxially adjacent.

5. An inductively coupled energy and data communication apparatus as claimed in claim 1 wherein a pair of tuned circuits respond independently to the first and second frequencies for respectively charging and discharging the energy storage capacitor.

6. An inductively coupled energy and data communication apparatus for a steering column assembly supporting a steering wheel assembly including an electrically actuated air bag inflator, the apparatus comprising:

a transformer having primary and secondary windings in spaced adjacency, said primary winding being non-rotatably secured to the steering column assembly and said secondary winding being rotatably secured to the steering column assembly for rotation with the stewing wheel;

a primary energization circuit for energizing the primary winding at a first frequency during predetermined non-deployment conditions and at a second frequency during predetermined deployment conditions;

first and second loads selectively coupled to the secondary winding in accordance with predetermined binary patterns, the first load providing a first reflected impedance to the primary winding corresponding to a first binary state and the second load providing a second reflected impedance to the primary winding corresponding to a second binary state;

circuitry for decoding the first and second reflected impedances into the first and second binary states corresponding to the predetermined binary patterns;

an energy storage capacitor;

circuitry responsive to the first frequency to store charge to the energy storage capacitor from the secondary winding during non-deployment conditions; and, circuitry responsive to the second frequency for discharging the stored charge through the inflator during deployment conditions to deploy the air bag.

7. An inductively coupled energy and data communication apparatus as claimed in claim 6 wherein said primary and secondary windings are concentric.

8. An inductively coupled energy and data communication apparatus as claimed in claim 6 wherein the circuitry for decoding the first and second reflected impedances into the first and second binary states corresponding to the predetermined binary patterns comprises voltage amplitude demodulation circuitry.

9. An inductively coupled energy and data communication apparatus as claimed in claim 6 wherein the circuitry responsive to the first frequency to store charge to the energy storage capacitor from the secondary winding during non-deployment conditions comprises one of a tuned circuit and a phase locked loop circuit, and the circuitry responsive to the second frequency for discharging the stored charge through the inflator during deployment conditions to deploy the air bag comprises one of a tuned circuit and a phase locked loop circuit.

10. A method for transferring energy and data between a vehicle side wiring harness and rotating portions of a steering column assembly including a charge storage capacitor and airbag inflator module, the method comprising:

providing an inductive coupling including primary and secondary windings, the primary winding being associated with the vehicle side wiring harness and the secondary winding being associated with the rotating portions of the steering column assembly;

oscillating the primary winding at a first frequency during periods of vehicle operation wherein predetermined airbag deployment conditions are not satisfied;

oscillating the primary winding at a second frequency during periods of vehicle operation wherein the predetermined airbag deployment conditions are satisfied;

transferring energy from the secondary winding to the charge storage capacitor when the secondary winding oscillates at the first frequency;

discharging energy from the charge storage capacitor to the airbag inflator to deploy the air bag when the secondary winding oscillates at the second frequency.

11. The method for transferring energy and data as claimed in claim 10 further comprising:

providing a serial data stream for transfer from the rotating portions of a steering column assembly to the vehicle side wiring harness;

changing the electrical impedance of the inductive coupling at the secondary winding between first and second values corresponding to first and second binary states of the serial data stream;

detecting reflected impedance changes in the primary winding occasioned by the electrical impedance changes of the inductive coupling at the secondary winding;

decoding said detected impedance changes back into the serial data stream.

12. The method for transferring energy and data as claimed in claim 11 wherein the step of detecting reflected impedance changes in the primary winding includes detecting modulation of primary voltage.

* * * * *